(12) United States Patent
Couffignal et al.

(10) Patent No.: US 8,196,863 B2
(45) Date of Patent: Jun. 12, 2012

(54) AIRCRAFT HORIZONTAL STABILIZER

(75) Inventors: Jean-Pierre Couffignal, Blagnac (FR); Frederic Vinches, Larra (FR)

(73) Assignee: Airbus Operations SAS, Toulouse (FR)

( * ) Notice: Subject to any disclaimer, the term of this patent is extended or adjusted under 35 U.S.C. 154(b) by 1041 days.

(21) Appl. No.: 11/963,957

(22) Filed: Dec. 24, 2007

(65) Prior Publication Data

US 2010/0038474 A1    Feb. 18, 2010

(30) Foreign Application Priority Data

Jan. 4, 2007 (FR) ..................... 07 00036

(51) Int. Cl.
*B64C 9/00* (2006.01)

(52) U.S. Cl. ........................................ 244/87

(58) Field of Classification Search .............. 244/87, 244/194, 195, 204, 210, 214, 216, 218, 219
See application file for complete search history.

(56) References Cited

U.S. PATENT DOCUMENTS

| | | | |
|---|---|---|---|
| 2,343,986 A | 3/1944 | Leutholt | |
| 2,348,252 A * | 5/1944 | Griswold | 244/211 |
| 2,350,809 A | 6/1944 | Giovanni | |
| 3,438,598 A | 4/1969 | Tammel | |
| 5,056,741 A * | 10/1991 | Bliesner et al. | 244/214 |
| 5,680,124 A * | 10/1997 | Bedell et al. | 340/945 |
| 6,213,433 B1 * | 4/2001 | Gruensfelder et al. | 244/219 |
| 2007/0034746 A1 * | 2/2007 | Shmilovich et al. | 244/207 |

FOREIGN PATENT DOCUMENTS

| | | |
|---|---|---|
| BE | 1 006 009 | 4/1994 |
| EP | 0 100 775 | 2/1984 |
| FR | 2 853 881 | 10/2004 |
| JP | 54 059798 | 5/1979 |

OTHER PUBLICATIONS

Preliminary Search Report dated Jul. 11, 2007 with English translation.

* cited by examiner

*Primary Examiner* — Rob Swiatek
*Assistant Examiner* — Valentina Xavier
(74) *Attorney, Agent, or Firm* — Dickinson Wright PLLC

(57) ABSTRACT

According to the invention, the horizontal stabilizer comprises a fixed intermediate part secured to the structure of said aircraft and at least one mobile edge part able to slide with respect to said fixed intermediate part, transversely to the length thereof. Mobile flaps are able to provide the aerodynamic continuity of the suction face and of the pressure face of said stabilizer when said mobile edge part is deployed.

4 Claims, 7 Drawing Sheets

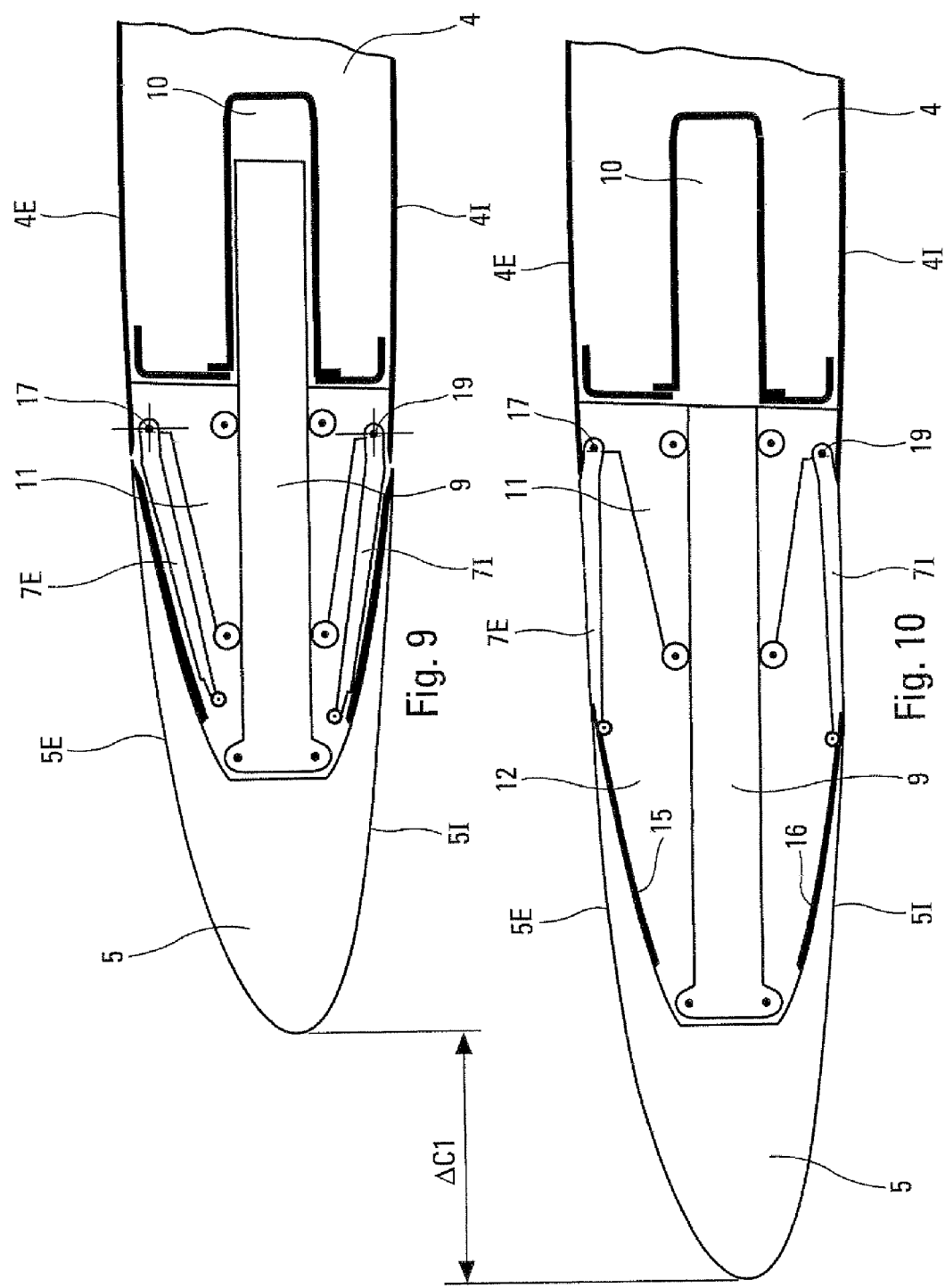

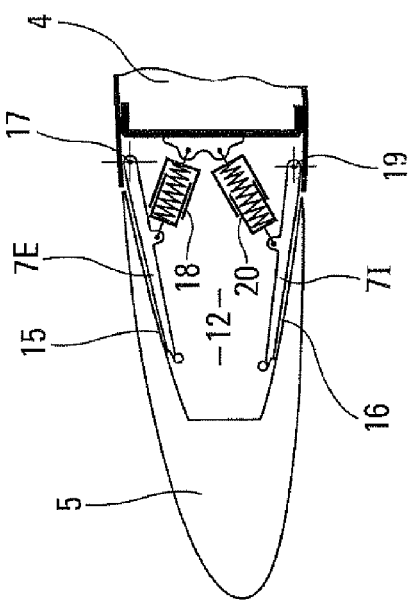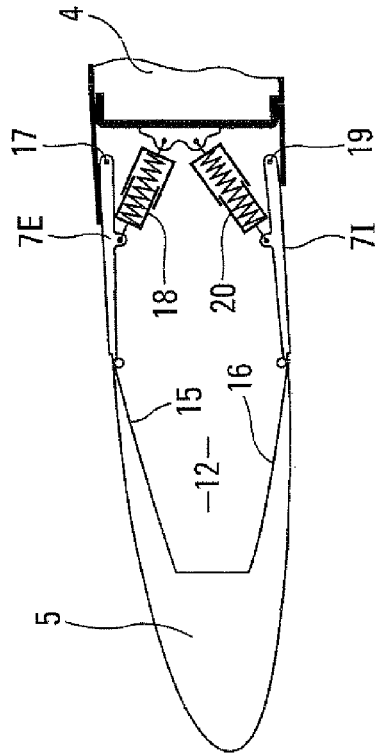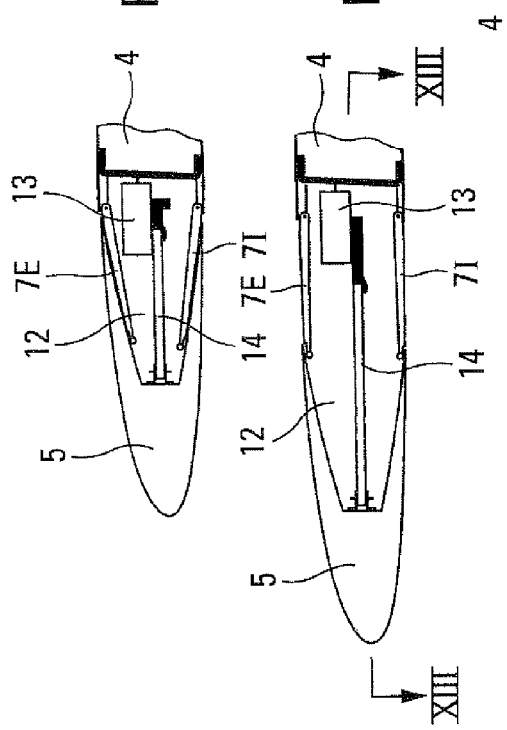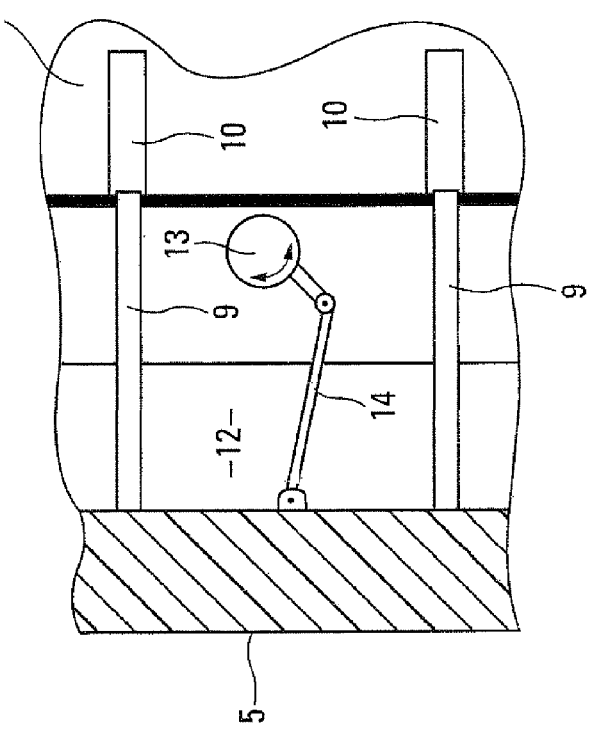

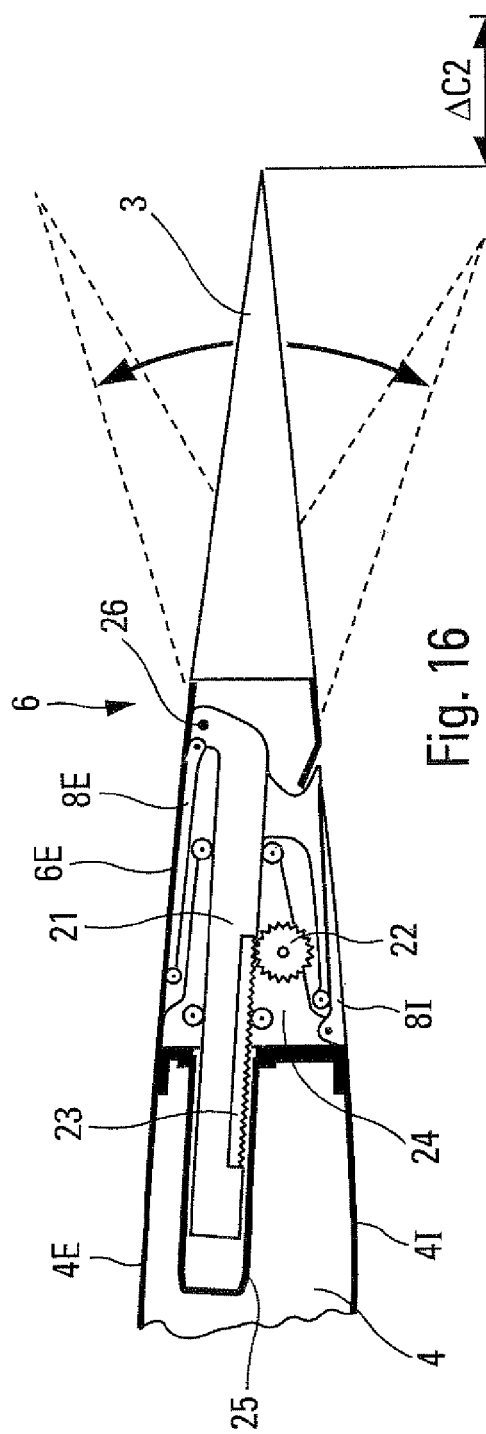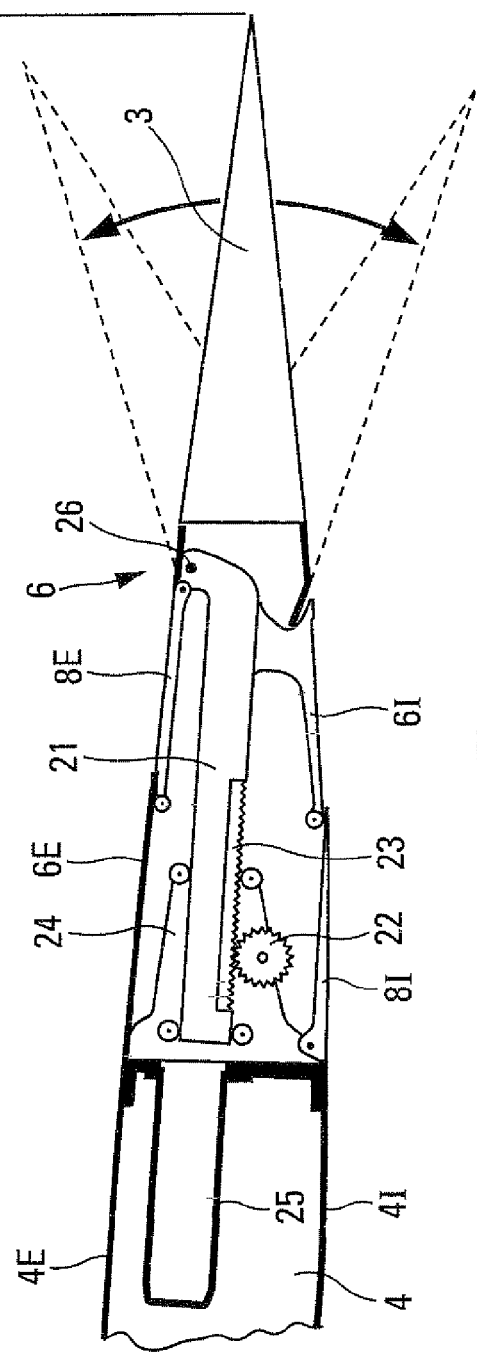

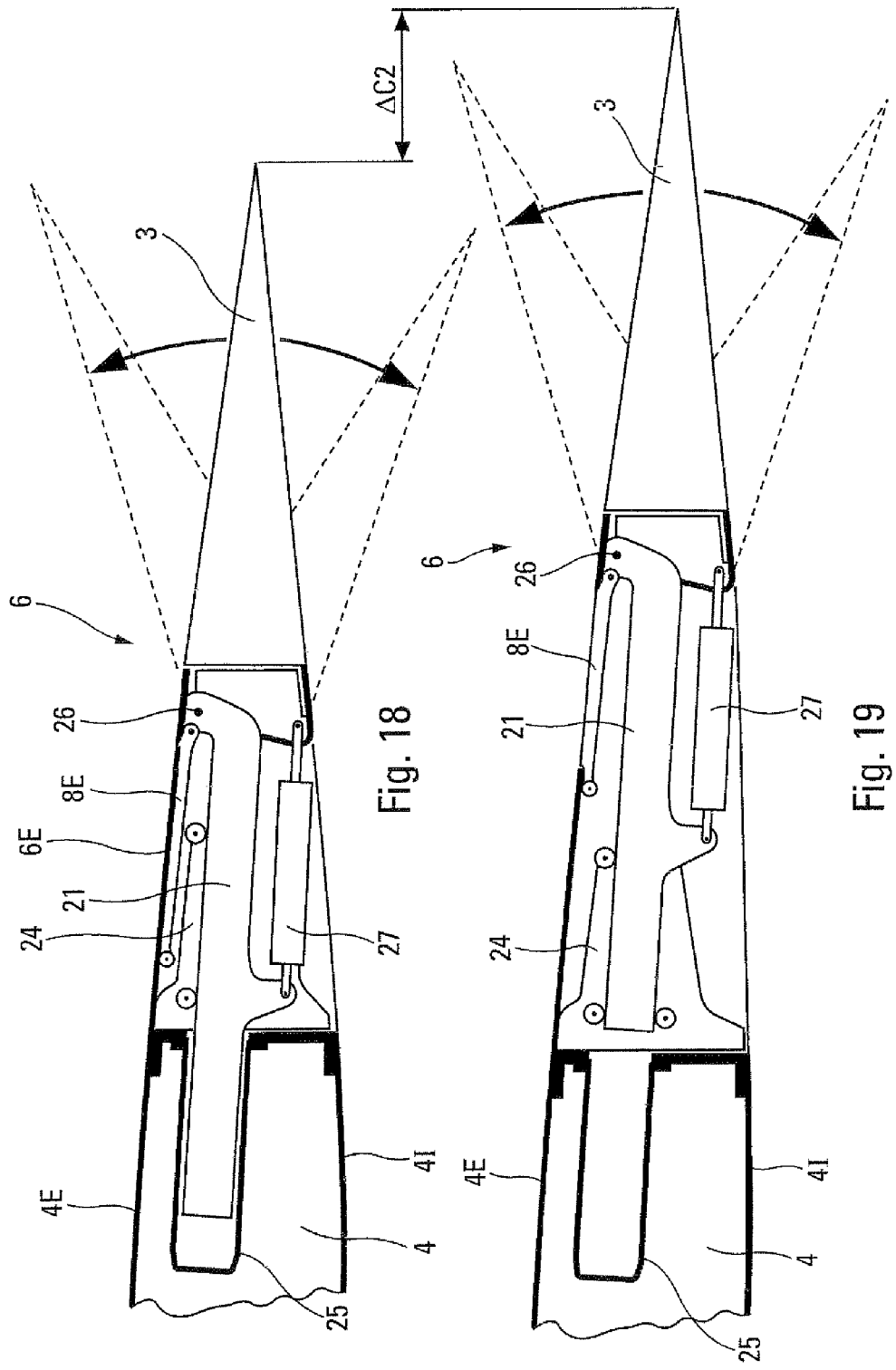

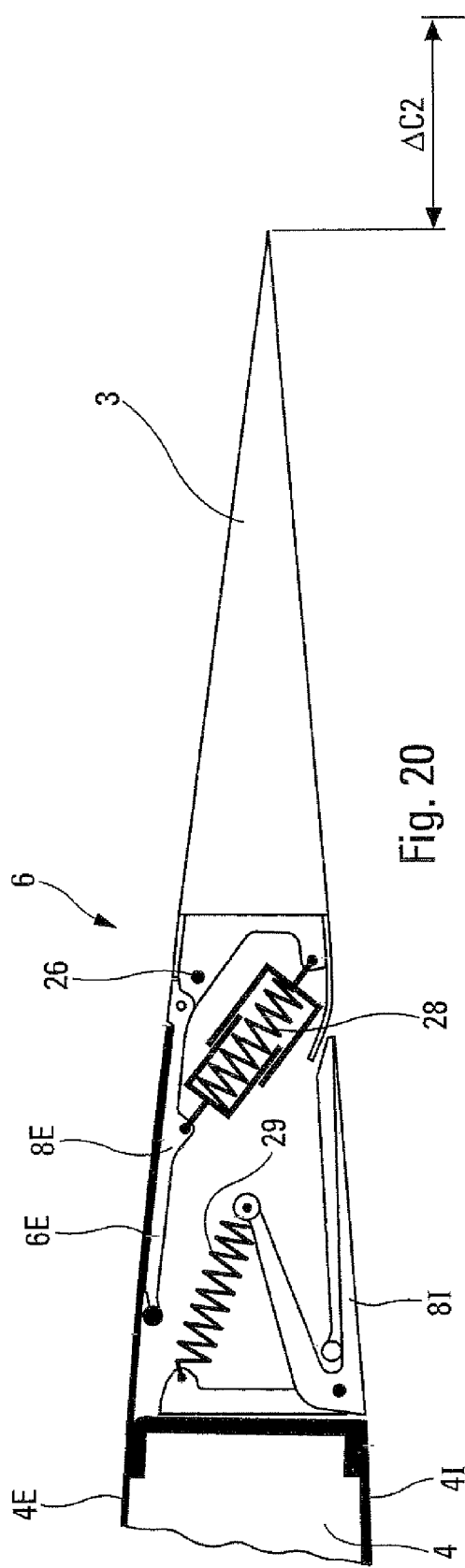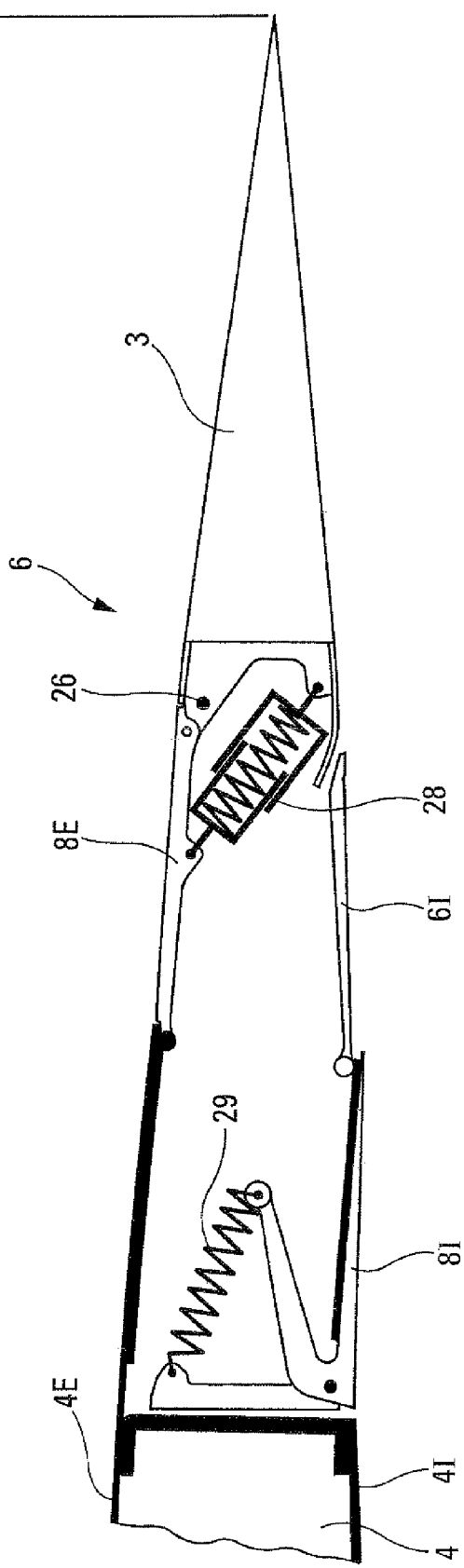

AIRCRAFT HORIZONTAL STABILIZER

BACKGROUND OF THE INVENTION

The present invention relates to horizontal stabilizers for aircraft.

It is known that an aircraft comprises a tail horizontal stabilizer intended to provide it with stability in the horizontal plane. It is also known that the surface area of such a horizontal stabilizer is determined to provide said stability in the critical phases of take off and landing, in which phases the aircraft speed is low.

As it happens, in cruising flight, the surface area of the horizontal stabilizer thus determined for the take off and landing phases is greater than the surface area strictly needed to maintain the stability of the aircraft. This then results in needless drag and needless additional fuel consumption.

DESCRIPTION OF THE PRIOR ART

To remedy this disadvantage, Japanese Document JP-54059798A (Mitsubishi Heavy Ind Ltd), filed on Oct. 20, 1977 under the number 52126328 and published on May 14, 1979 describes by way of a theoretical exercise an aircraft variable-area horizontal stabilizer comprising a fixed intermediate part secured to the structure of said aircraft and at least one mobile edge part able to slide with respect to said fixed intermediate part, transversely to the length thereof said mobile edge part being able to adopt at least:

a deployed position, for which said horizontal stabilizer has a first surface area guaranteeing said aircraft stability while said aircraft is in the take off and landing phases, and a retracted position for which said horizontal stabilizer has a second surface area, smaller than said first surface area, guaranteeing said aircraft stability during cruising flight.

Thus, it is possible to optimize the performance of said horizontal stabilizer to suit the phase of flight of the aircraft while at the same time reducing the draft and fuel consumption during cruising flight.

SUMMARY OF THE INVENTION

It is an object of the present invention to improve this variable-area known horizontal stabilizer to make it truly usable. Thus, in the variable-area horizontal stabilizer according to the present invention, said mobile edge part has a limited surface area and is combined with mobile flaps, for example rotary ones, able to provide the aerodynamic continuity of the suction face and of the pressure face of said stabilizer between said mobile edge part and said fixed intermediate part when said mobile edge part is in the deployed position. Said mobile flaps may be borne by said fixed intermediate part or by said mobile edge part. They are elastically loaded so that they can move spontaneously from a retracted position when said stabilizer is itself in the retracted position into a deployed position providing said aerodynamic continuity of the suction face and of the pressure face when said stabilizer is in its deployed position and, conversely, from said deployed position providing the aerodynamic continuity to said retracted position when said stabilizer itself moves from its deployed position to its retracted position.

Said mobile edge part may correspond to the leading edge of said horizontal stabilizer. In this case:

said leading edge may be hollow and may internally comprise two inclines facing each other, these diverging toward said fixed intermediate part;

a suction face mobile flap and a pressure face mobile flap may be articulated to said fixed intermediate part; and springs may be provided for elastically pressing said mobile flaps against their respective inclines.

By contrast, when said mobile edge part corresponds to the trailing edge of said horizontal stabilizer, it is advantageous for said mobile edge part to comprise at least one slider which is able to move with respect to said fixed intermediate part and to which the aircraft elevators are articulated, said slider bearing the means of operating said elevators.

BRIEF DESCRIPTION OF THE DRAWINGS

The figures of the attached drawing will make it easy to understand how the invention may be embodied. In these figures, identical references denote elements which are similar.

FIGS. 9 and 10 show, on a larger scale and in cross section, the front part of the horizontal stabilizer of FIGS. 2 to 6 in the retracted position and in the deployed position respectively.

FIGS. 11 and 12 schematically illustrate in cross section the means of operating the leading edge of the stabilizer of FIGS. 2, 6, 9 and 10 in the retracted position and in the deployed position, respectively.

FIG. 3 is a diagrammatic cross section on XIII-XIII of FIG. 12.

FIGS. 14 and 15 show the means of elastically pressing the suction face and pressure face mobile flaps, the leading edge of the stabilizer of FIGS. 2, 6, 9 and 10 being in the retracted position and in the deployed position, respectively.

FIGS. 16 and 17 show, on a larger scale and in cross section, the rear part of the horizontal stabilizer of FIGS. 3, 4, 7 and 8 in the retracted position and in the deployed position, respectively.

FIGS. 18 and 19 illustrate, in views similar to FIGS. 16 and 17, respectively, the means of operating the elevators of said horizontal stabilizer.

FIGS. 20 and 21 show, in views similar to FIGS. 16 and 17 respectively, the means of elastically pressing the suction face and pressure face mobile flaps.

DESCRIPTION OF THE PREFERRED EMBODIMENTS

Figure 1:
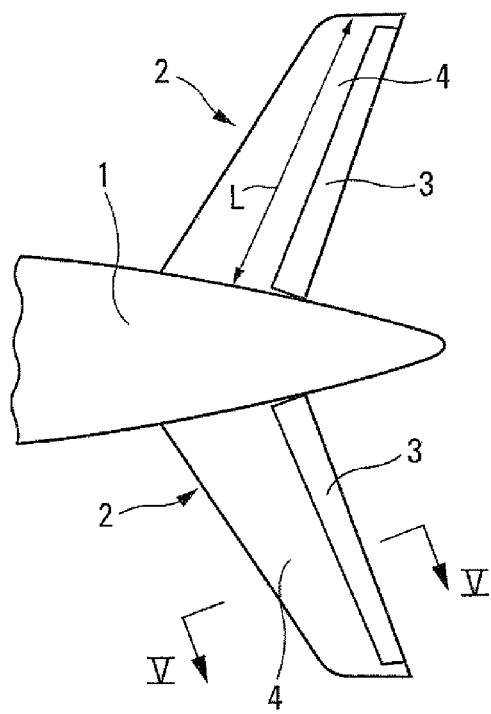
FIG. 1 schematically shows the rear part of the fuselage of an airplane provided with a variable-area horizontal stabilizer in the retracted position that corresponds to cruising flight.

FIGS. 1 to 4 schematically depict the rear part 1 of the fuselage of an airplane (not depicted in greater detail), said rear part being provided with a horizontal stabilizer 2 which, as usual, bears elevators 3.

As shown also by FIGS. 5 to 8, the horizontal stabilizer 2 comprises an intermediate part 4, a leading edge part 5 and a trailing edge part 6.

The intermediate part 4 forms the box structure of the stabilizer via which the horizontal stabilizer 2 is secured to the rear part of the fuselage 1. It has a suction face 4E and a pressure face 4I.

The leading edge part 5 has a suction face 5E and a pressure face 5I. The trailing edge part 6 bears the elevators 3 and has a suction face 6E and a pressure face 6I.

The leading edge part 5 and/or the trailing edge part 6 is able to slide with respect to the fixed intermediate part 4 transversely to the length L thereof.

FIGS. 1 to 5 illustrate the configuration of the stabilizer 2 in cruising flight. In this configuration, the leading edge part 5 and the trailing edge part 6 are in contact with the intermediate part 4, the suction face and the pressure face of the horizontal stabilizer 2 being formed by the suction faces 4E, 5E, 6E and the pressure faces 4I, 5I, 6I, respectively. Thus, in the configuration of FIGS. 1 and 5, the leading edge part 5 and/or the trailing edge part 6 are/is in the retracted position. The chord of the profile corresponding to the section line V-V is therefore equal to CC.

Figure 2:
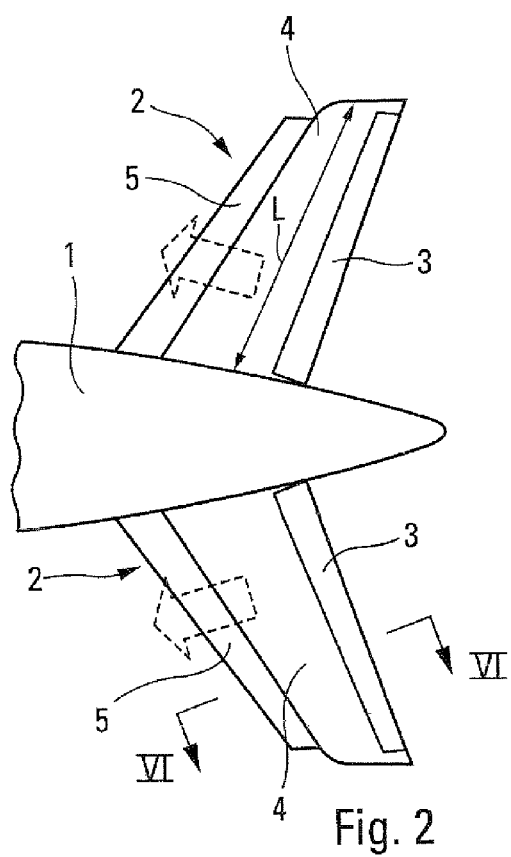
Figure 5:
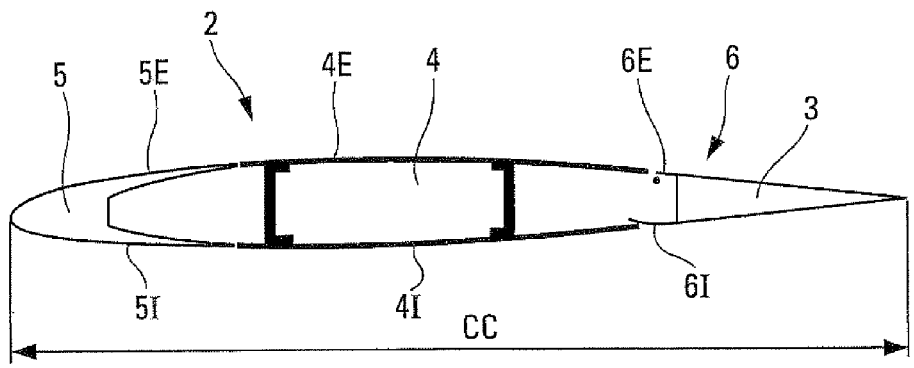
FIGS. 5 to 8 are cross sections on V-V, VI-VI, VII-VII and VIII-VIII marked in FIGS. 1 to 4 respectively and correspond to a profile located in the same position on the variable-area horizontal stabilizer according to the present invention.
Figure 6:
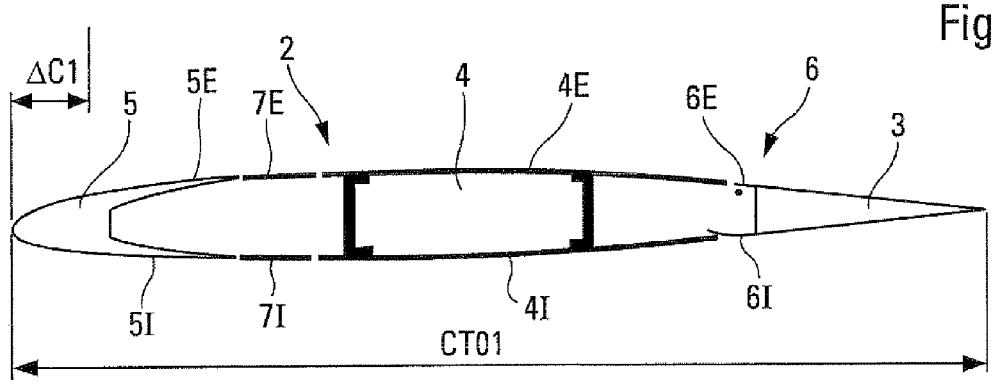

FIGS. 2 and 6 illustrate a configuration of the stabilizer 2 that can be used for take off and landing: in this configuration, the leading edge part 5 is in the deployed position, forward of the intermediate part 4, and a mobile suction face flap 4E and a mobile pressure face flap 7I provide the aerodynamic continuity between the suction faces 5E and 4E and between the pressure faces 5I and 4I respectively. In this case, the chord of the profile corresponding to the section line VI-VI (positioned at the same point on the horizontal stabilizer 2 as the section line V-V) is equal to CT01, which is ΔC1 longer than the chord CC. The result of this, by comparison with the retracted configuration of FIGS. 1 and 5, is an increase in the surface area of said horizontal stabilizer 2 which may be as much as a 10% increase.

Figure 3:
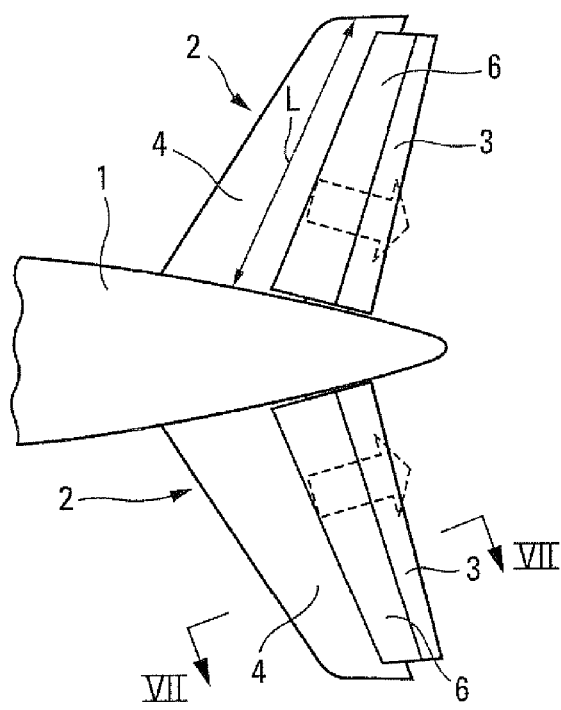
FIGS. 2 to 4 illustrate three deployed configurations of the variable-area horizontal stabilizer of FIG. 1, these being intended for take off and landing.
Figure 7:
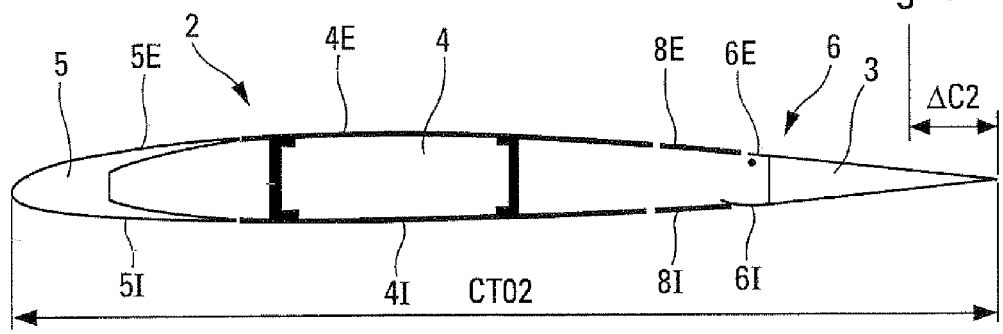

FIGS. 3 and 7 illustrate another configuration of the stabilizer 2 that can be used for take off and landing: in this other configuration, the trailing edge part 6 is in the deployed position, to the rear of the intermediate part 4, and a mobile suction face flap 8E and a mobile pressure face flap 8I provide the aerodynamic continuity between the suction faces 4E and 6E and between the pressure faces 4I and 6I respectively. In this case, the chord of the profile corresponding to the section line VII-VII (positioned at the same point on the horizontal stabilizer 2 as the section lines V-V and VI-VI) is equal to CT02, which is ΔC2 longer than the chord CC. As a result, by comparison with the retracted configuration of FIGS. 1 and 5, there is an increase in the surface area of said horizontal stabilizer 2 which may be as much as a 10% increase.

Figure 4:
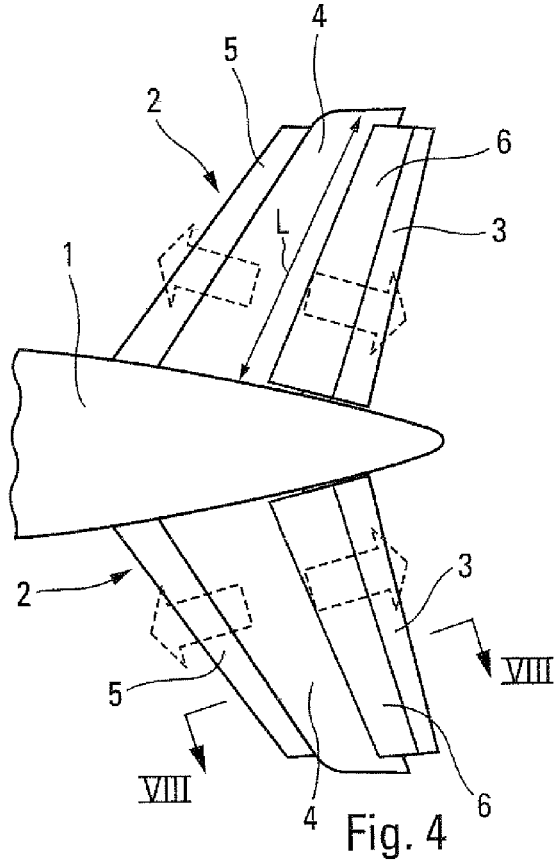
Figure 8:
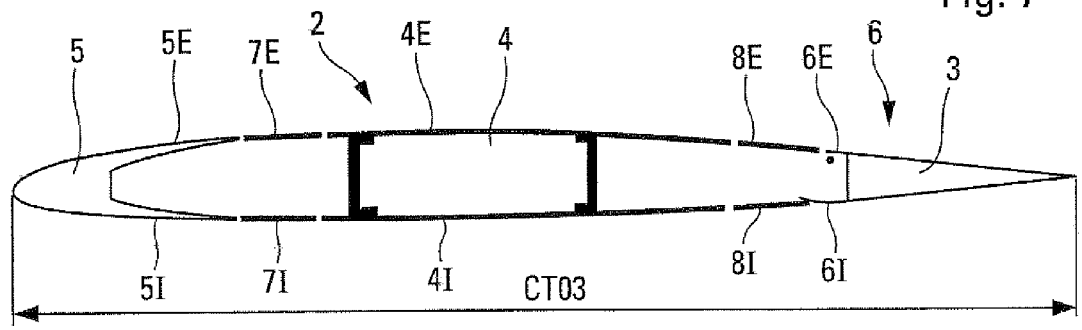

The deployed configuration depicted in FIGS. 4 and 8 and which can also be used for take off and landing, combines the configurations of FIGS. 2 and 6 with those of FIGS. 3 and 7: in this configuration, the leading edge part 5 is deployed forward by ΔC1 and the trailing edge part is deployed rearward by ΔC2, the flaps 7E, 8E, 7I, 8I providing the aerodynamic continuity of the suction faces 5E, 4E, 6E and the pressure faces 5I, 4I, 6I, respectively. The chord CT03 of the profile corresponding to the section line VII-VIII (positioned at the same point on the horizontal stabilizer 2 as the section lines V-V, VI-VI and VII-VII) is therefore. ΔC1+ΔC2 longer than the chord CC. This results, by comparison with the retracted configurations of FIGS. 1 and 5, in an increase in surface area of said horizontal stabilizer 2 which may be as much as a 20% increase.

In the embodiment of FIGS. 9, 10 and 13 for implementing the configurations of FIGS. 2, 6 and 4, 8, the leading edge part 5 is secured to guide sliders 9 in the form of bars. These sliders 9 are guided by roller units 11 secured to said intermediate part 4. When the latter needs to be sealed (for example because it is used as a fuel tank), sealed housings 10 may be provided to house the rear part of the sliders 9.

Facing the intermediate part 4, the leading edge part 5 has a recess 12 through which the sliders 9 pass and which is capable of accommodating the roller units 11 when said leading edge part 5 is retracted (FIG. 9).

In this retracted position, the recess 12 is also capable of housing drive means, secured to the intermediate part 4 and able to cause it to slide with respect thereto. In the example depicted in FIGS. 11 to 13, these drive means consist of a motor 13 and a linkage 14.

The recess 12 has two inclines 15 and 16 diverging toward the fixed intermediate part 4. Bearing against the incline 15, possibly via rollers, is the front end of the mobile suction face flap 7E, the rear end of which is articulated to the fixed intermediate part 4 about an axis 17 orthogonal to the sliders 9. The mobile suction face flap 7E is pressed elastically against the incline 15 by springs 18 resting against the fixed intermediate part 4 and able to be housed in the recess 12 when the leading edge part 5 is in the retracted position (see FIGS. 14 and 15). Likewise, bearing against the incline 16, possibly via rollers, is the front end of the mobile suction face flap 7I, the rear end of which is articulated to the fixed intermediate part 4 about an axis 19 orthogonal to the slides 9. The mobile pressure face flap 7I is pressed elastically against the incline 16 by springs 20 which bear against the fixed intermediate part 4 and can be housed in the recess 12 when the leading edge part 5 is in the retracted position.

It will be readily understood that, by virtue of the action of the inclines 15, 16 and of the springs 18, 20, the mobile flaps 7E and 7I automatically deploy to adopt their position in the aerodynamic continuity of the suction faces 5E and 4E and of the pressure faces 5I and 4I, respectively, when said leading edge part 5 itself is deployed forward under the action of the drive means 13, 14 and, conversely, automatically retract into the recess 12 when said leading edge part 5 is retracted rearward toward the fixed intermediate part 4.

FIGS. 16 to 21 depict an embodiment of the present invention in which said mobile edge part is the trailing edge part of the horizontal stabilizer (see FIGS. 3, 4, 7 and 8). In this embodiment, the trailing edge part 6 comprises guide sliders 21 able to move with respect to the fixed intermediate part 4 under the action of a rack 23 and pinion 22 system. The sliders 21 are guided by roller units 24. When the part 4 needs to be sealed (for example when it is used as a fuel tank), sealed housings 25 may be provided to house the front part of the sliders 21.

The elevators 3 are articulated, at 26, to said sliders 21 and therefore move as one therewith. In addition, the sliders 21 bear actuators 27 for rotating the elevators 3 (see FIGS. 18 and 19).

In this embodiment, the mobile suction face flap 8E is articulated to the sliders 21 and is on the inside of the suction face 6E in the retracted position; in addition, the mobile suction face flap 8E is pressed against the suction face 6E by springs 28 (see FIGS. 20 and 21). By contrast, the mobile pressure face flap 8I is articulated to the fixed intermediate part 4 and is on the outside of the pressure face 6I. Springs 29 press the pressure face flap 8I against the pressure face 6I.

It will be noted that the horizontal stabilizer according to the present invention, which occupies its deployed position during take off and landing phases, may advantageously be used in aircraft comprising at least one engine positioned at the upper rear part of their fuselage so that the engine noise traveling downward is screened off during said phases.

The invention claimed is:
1. A horizontal stabilizer to be used in an aircraft, said horizontal stabilizer comprising:

a fixed intermediate part secured to a structure of said aircraft and at least one mobile edge part configured to slide with respect to said fixed intermediate part, transversely to a length of said fixed intermediate part, said mobile edge part being configured to adopt at least:

a deployed position, for which said horizontal stabilizer has a first surface area used during takeoff and landing phases of said aircraft, and a retracted position for which said horizontal stabilizer has a second surface area, smaller than said first surface area, used when said aircraft is in cruising flight; and mobile flaps configured to provide aerodynamic continuity of a suction face and of a pressure face of said horizontal stabilizer, between said mobile edge part and said fixed intermediate part when said mobile edge part is in the deployed position, said mobile flaps being elastically loaded so that the mobile flaps are configured to move spontaneously:

from a retracted position when said horizontal stabilizer is in the retracted position into a deployed position that provides said aerodynamic continuity of the suction face and of the pressure face of said horizontal stabilizer when the horizontal stabilizer is in the deployed position; and from said deployed position that provides the aerodynamic continuity to said retracted position when said horizontal stabilizer moves from the deployed position into the retracted position, wherein in the retracted position, the mobile flaps are housed within a recess of the horizontal stabilizer.

2. The horizontal stabilizer as claimed in claim 1, in which said mobile flaps are rotary.

3. The horizontal stabilizer as claimed in claim 1, in which at least one of the mobile flaps is borne by said fixed intermediate part.

4. The horizontal stabilizer as claimed in claim 2, in which:

said mobile edge part corresponds to a leading edge of said horizontal stabilizer;

said leading edge is hollow and internally has two inclines facing each other, the two inclines diverging toward said fixed intermediate part;

said mobile flaps comprise a suction face mobile flap and a pressure face mobile flap which are articulated to said fixed intermediate part; and springs are provided for elastically pressing each one of said mobile flaps against a respective one of the inclines.

* * * * *